(12) United States Patent
    Galigekere et al.

(10) Patent No.: US 11,557,921 B2
(45) Date of Patent: Jan. 17, 2023

(54) WIRELESS POWER SYSTEM

(71) Applicant: UT-Battelle, LLC, Oak Ridge, TN (US)

(72) Inventors: Veda Prakash Galigekere, Oak Ridge, TN (US); Subho Mukherjee, Bhubaneswar (IN); Burak Ozpineci, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 72 days.

(21) Appl. No.: 17/195,070

(22) Filed: Mar. 8, 2021

(65) Prior Publication Data

US 2021/0367453 A1    Nov. 25, 2021

Related U.S. Application Data

(60) Provisional application No. 62/988,224, filed on Mar. 11, 2020.

(51) Int. Cl.
| | | |
|---|---|---|
| *H02J 50/12* | (2016.01) | |
| *B60L 53/126* | (2019.01) | |
| *B60L 53/60* | (2019.01) | |
| *H02M 7/5387* | (2007.01) | |
| *H02M 1/42* | (2007.01) | |

(52) U.S. Cl.
    CPC ............ *H02J 50/12* (2016.02); *B60L 53/126* (2019.02); *B60L 53/60* (2019.02); *H02M 1/4216* (2013.01); *H02M 7/5387* (2013.01); *B60L 2210/40* (2013.01); *H02J 2310/48* (2020.01)

(58) Field of Classification Search
    CPC ..... H02J 50/12; H02J 2310/48; B60L 53/126; B60L 53/60; B60L 2210/40; B60L 53/12; B60L 53/122; H02M 1/4216; H02M 7/5387; H02M 1/007; H02M 1/4233; H02M 7/53878; H02M 3/01; H02M 3/33573; Y02T 10/70; Y02T 10/7072; Y02T 90/12; Y02T 90/14
    See application file for complete search history.

(56) References Cited

U.S. PATENT DOCUMENTS

| 8,742,625 B2 | 6/2014 | Baarman et al. |
|---|---|---|
| 9,935,468 B2 * | 4/2018 | Iwawaki .................. H02J 50/12 |

(Continued)

FOREIGN PATENT DOCUMENTS

| CN | 108023411 A | * | 5/2018 | .............. H02J 50/10 |
|---|---|---|---|---|
| KR | 10-2011-0131805 A | * | 10/2011 | |

(Continued)

OTHER PUBLICATIONS

Amin, "Power Decoupling Control of the Bidirectional Converter to Eliminate the Double Line Frequency Ripple," Nov. 2018, Proceedings of the KIPE Conference, pp. 62-64 (Year: 2018).*

*Primary Examiner* — Pinping Sun
(74) *Attorney, Agent, or Firm* — Warner Norcross + Judd LLP (57) ABSTRACT

A system and method are provided for a feed-forward control of an inverter to reduce, and potentially minimize, a DC link capacitor of a wireless power transfer system. The feed-forward control may be utilized to reduce the capacitance of the DC link capacitor in a single-phase series-series compensated WPT system.

16 Claims, 10 Drawing Sheets

(56) References Cited

U.S. PATENT DOCUMENTS

| | | | | |
|---|---|---|---|---|
| 2014/0339916 A1* | 11/2014 | Fells | ....................... | H02J 7/025 307/104 |
| 2015/0015197 A1* | 1/2015 | Mi | ......................... | H02J 5/005 320/108 |
| 2015/0061577 A1* | 3/2015 | Ye | .......................... | H02J 50/80 320/108 |
| 2015/0372584 A1* | 12/2015 | Hirota | ............... | H02M 3/33584 363/37 |
| 2017/0279307 A1* | 9/2017 | Cho | ......................... | H02J 7/025 |
| 2019/0229609 A1* | 7/2019 | Li | ............................. | H02J 1/02 |
| 2020/0290461 A1* | 9/2020 | Lu | ............................ | B60L 3/12 |

FOREIGN PATENT DOCUMENTS

| | | | | |
|---|---|---|---|---|
| WO | WO-2013128641 A1 * | 9/2013 | .............. | H02J 50/12 |
| WO | WO-2013179763 A1 * | 12/2013 | .............. | H02J 17/00 |
| WO | WO-2014125698 A1 * | 8/2014 | ............ | H02M 3/337 |

* cited by examiner

WIRELESS POWER SYSTEM

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF INVENTION

The present disclosure relates to the field of wireless power transfer systems, also described as wireless energy transfer systems.

BACKGROUND

The input voltage of a conventional wireless power transfer (WPT) system is generally supplied by an active front-end converter, which may operably provide unity power factor for the grid current received from an AC power source. In case of a conventional single-phase system, the DC link voltage, VDC, is contaminated with ripple voltage at twice the frequency of the grid. This second harmonic ripple leads to losses and can propagate to the output. The ripple on the DC link in conventional systems is limited by increasing the DC link capacitance, thereby increasing the volume, weight, and cost of the system. Additional hardware circuitry can be used to limit the ripple and reduce the DC link capacitance, such as hardware for sinusoidal charging that is constrained by sinusoidal current being supplied to the load. For conventional WPT systems, the transmitter and receiver coils are physically on different units, and therefore feedback of signals from the secondary to primary side is slow and unreliable. The secondary diode bridge rectifier can be replaced by an active bridge with modulation that can be varied to try to eliminate the ripple from the output. However, this increases the sensor count and gate drive requirements. Furthermore, active rectification on the secondary is considered unreliable in terms of sensing and control due to the high-frequency (~85 kHz) AC voltage at the input.

Wireless charging systems for electric vehicles are a research topic of immense interest for the past few years. A large proportion of the conventional wireless chargers work on the principle of inductive power transfer where power is transferred across loosely coupled coils over an air gap.

SUMMARY

In general, one innovative aspect of the subject matter described herein can be embodied in a wireless power transfer (WPT) system for wirelessly providing AC power to an electric vehicle or a plug-in electric vehicle, the WPT system may include an off-board module including a DC-link capacitor bank to facilitate providing, during operation of the WPT system, a DC voltage with a ripple, and a voltage sensor to measure the DC voltage across the DC-link capacitor bank as a DC voltage signal VDC(t). The WPT system may include an H-bridge having a first phase leg and a second phase leg, where the H-bridge is coupled with the DC-link capacitor bank and configured to convert the DC voltage to a high-frequency AC voltage. The WPT system may include control circuitry configured to: receive the DC voltage signal VDC(t) from the voltage sensor, generate a driving signal for driving the H-bridge, and apply a first instance of the driving signal to the first phase leg and a second instance of the driving signal to the second phase leg, where the first and second instances of the driving signal have a relative phase shift α(t) that varies nonlinearly with the DC voltage signal VDC(t).

The foregoing and other embodiments can each optionally include one or more of the following features, alone or in combination. In particular, one embodiment includes all the following features in combination.

In some embodiments, the control circuitry may include a microcontroller configured to implement the relative phase shift α(t) that varies nonlinearly with the DC voltage signal VDC(t).

In some embodiments, the relative phase shift α(t) is based on a target amplitude $V_f$ of a fundamental component of the high-frequency AC voltage.

In some embodiments, a frequency of the fundamental component of the high-frequency AC voltage is 22 kHz or 85 kHz.

In some embodiments, the relative phase shift α(t) varies nonlinearly with the DC voltage signal $V_{DC}(t)$ in accordance with $$\alpha(t) = \cos^{-1}\left(\frac{\pi}{4V_{DC}(t)} V_f\right),$$

where $V_f$ is a target amplitude of a fundamental component of the high-frequency AC voltage.

In some embodiments, for a WPT system power rating of 100 kW, and for a DC voltage with a nominal value in a voltage range of 350-800 V and a ripple of ±10%, capacitance of the DC-link capacitor bank is in a capacitance range of 2-4 mF.

In some embodiments, the DC-link capacitor bank includes 10-20 film capacitors each having a capacitance of about 220 μF.

In some embodiments, the off-board module may include transmitter circuitry with a primary coil configured to wirelessly transmit the high-frequency AC voltage, and the WPT system includes an on-board module comprising a pick-up coil configured to receive the high-frequency AC voltage when the primary coil and the pick-up coil are disposed proximal to each other.

In general, one innovative aspect of the subject matter described herein can be embodied in a system for wirelessly transferring power to a remote device. The system may include a transmitter configured to wirelessly transmit power to a receiver of the remote device, and switching circuitry coupled to the transmitter, where the switching circuitry is configured to receive DC power, and where the switching circuitry is configured to apply input power to the transmitter based on the DC power. The switching circuitry may include a first switch controlled by a first drive signal and a second switch controlled by a second drive signal. The system may include a sensor configured to detect a characteristic of power of the DC power, and a controller operably coupled to the switching circuitry and the sensor, where the controller is configured to direct operation of the switching circuitry to apply the input power to the transmitter based on the DC power. The controller may be configured to vary a phase relationship between the first and second drive signals based on the characteristic of power sensed by the sensor with respect to the DC power received by the switching circuitry.

The foregoing and other embodiments can each optionally include one or more of the following features, alone or in combination. In particular, one embodiment includes all the following features in combination.

In some embodiments, the switching circuitry may include a third switch and a fourth switch controlled respectively by third and fourth drive signals. The first switch and the third switch may define a first phase leg, and the second switch and the fourth switch may define a second phase leg. The controller may be configured to vary a phase relationship between the first phase leg and the second phase leg based on the characteristic of power sensed by the sensor with respect to the DC power received by the switching circuitry.

In some embodiments, the characteristic of power is a DC voltage of the DC power received by the switching circuitry.

In some embodiments, the power supply circuitry may be operable to receive AC power having a fundamental component, the power supply circuitry operable to generate the DC power based on the AC power.

In some embodiments, the phase relationship between the first and second drive signals may be based on a target amplitude $V_f$ of the fundamental component of the AC power.

In some embodiments, the phase relationship between the first and second drive signals may be varied nonlinearly as a function of the characteristic of power sensed by the sensor with respect to the DC power received by the switching circuitry.

In some embodiments, the phase relationship is defined as α(t) and the characteristic of power is defined as $V_{DC}(t)$, and where the controller determines the phase relationship α(t) as $$\cos^{-1}\left(\frac{\pi}{4V_{DC}(t)}V_f\right).$$

In some embodiments, the system may include a receiver operable to receive power inductively transferred from the transmitter, where the receiver is provided in the remote device and operable to supply power to a load of the remote device.

In general, one innovative aspect of the subject matter described herein can be embodied in a wireless power supply for supplying power to a remote device. The wireless power supply may include a transmitter configured to wirelessly transmit power to a receiver of the remote device, and switching circuitry coupled to the transmitter, where the switching circuitry may be configured to receive DC power, and where the switching circuitry may be configured to apply input power to the transmitter based on the DC power. The switching circuitry may include a first switch controlled by a first drive signal and a second switch controlled by a second drive signal. The system may include a sensor configured to detect a characteristic of power of the DC power, and a controller operably coupled to the switching circuitry and the sensor. The controller may be configured to direct operation of the switching circuitry to apply the input power to the transmitter based on the DC power, and the controller may be configured to vary a phase relationship between the first and second drive signals based on the characteristic of power sensed by the sensor with respect to the DC power received by the switching circuitry.

The foregoing and other embodiments can each optionally include one or more of the following features, alone or in combination. In particular, one embodiment includes all the following features in combination.

In some embodiments, power supply circuitry may be operable to receive AC power having a fundamental component, where the power supply circuitry may be operable to generate the DC power based on the AC power.

In some embodiments, the phase relationship between the first and second drive signals is based on a target amplitude $V_f$ of the fundamental component of the AC power, and the phase relationship between the first and second drive signals is varied nonlinearly as a function of the characteristic of power sensed by the sensor with respect to the DC power received by the switching circuitry.

In some embodiments, the phase relationship is defined as α(t) and the characteristic of power is defined as $V_{DC}(t)$, and where the controller (140) determines the phase relationship α(t) as $$\cos^{-1}\left(\frac{\pi}{4V_{DC}(t)}V_f\right).$$

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DETAILED DESCRIPTION

In one embodiment, a system and method are provided for a feed-forward control of an inverter to reduce, and potentially minimize, a DC link capacitor of a wireless power transfer system. The feed-forward control may be utilized to reduce the capacitance of the DC link capacitor in a single-phase series-series compensated WPT system. Reduction of the DC link capacitor can result in a more compact hardware architecture.

The feedforward-based approach in one embodiment may include modulating the switches on the primary-side of the WPT system as a function of the DC link voltage and may maintain a substantially steady output voltage under any DC bus conditions. The feedforward control may be based on sensor output from a sensor with respect to the DC link voltage. The DC link voltage may be substantially free from high frequency components, and therefore a low bandwidth cost-effective voltage sensor may be sufficient to provide a sensor output usable as a basis for conducting feedforward control with respect to switching circuitry that drives a transmitter of the WPT system.

Additionally, or alternatively, switching methodology described herein may provide reduced, potentially minimal, increase in the turn-on switching loss of the inverter (e.g., switching circuitry) of a wireless power supply.

I. Overview

Figure 1A:
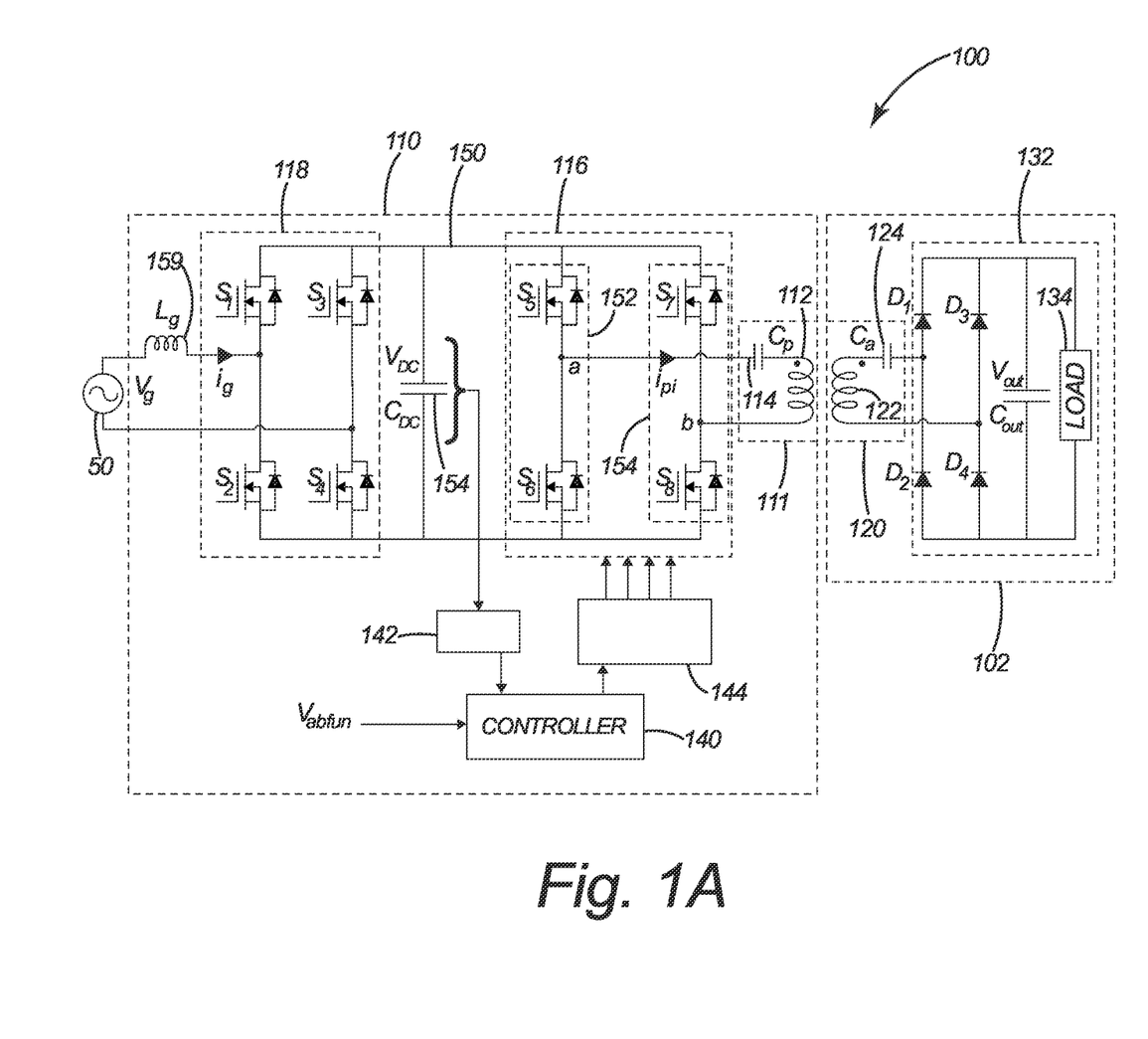
FIG. 1A shows a wireless power system in accordance with one embodiment.

A series-series compensated wireless power transfer (WPT) system is shown in accordance with one embodiment in FIG. 1A, and generally designated 100. As discussed herein, the WPT system 100 may be configured differently than the configuration depicted in the illustrated embodiment. For instance, the WPT system 100 in one embodiment may be a series-parallel compensated system (or parallel-parallel or parallel-series). As another example, the WPT system 100 may be configurable for three-phase operation. Examples of three phase topologies are described in U.S. Appl. No. 17,127,197, entitled WIRELESS POWER SYSTEM, filed Dec. 18, 2020, to Asa et al.—the disclosure of which is hereby incorporated by reference in its entirety.

The input voltage of the WPT system 100 may be provided in the form of a DC power source 150, and may be supplied by power supply circuitry 118 based on power received from an AC power source 50 (e.g., grid power). The power supply circuitry 118 may be rectification circuitry (passive or active). For instance, in the illustrated embodiment, the power supply circuitry 118 is an active front-end converter that may be configured to substantially ensure the grid current is at unity power factor. The active front-end can be single-phase or three-phase.

In case of single-phase or unbalanced 3-phase system, the DC link voltage may be contaminated with ripple voltage at twice the frequency of the grid. This ripple may be the result of rectification of the AC power source 50 by the power supply circuitry 118 to provide the DC power source 50, such as by full wave rectification of the AC power source 50 and filtering with a DC link capacitor 156. This second harmonic ripple can lead to losses and, if uncompensated, may propagate to the output in the form of relatively large power ripples. The ripple voltage at the output of the WPT system 100 may be reduced, and optionally eliminated in accordance with one embodiment.

The ripple on the DC link or DC power source 50 may be reduced by increasing the capacitance of the DC link capacitor 56, thereby increasing the volume, weight, and cost of the system. However, a DC link capacitor 156 of such size can occupy 20-50% of the total volume of a WPT system 100. A switching methodology in accordance with one embodiment of the present disclosure may enable reduction of the DC link capacitor 156, enabling a more compact system.

A WPT system in accordance with one embodiment may implement feedforward control to reduce the input side DC link capacitance of series-series compensated systems. Compared to conventional control schemes for WPT systems, the feedforward-based approach achieves significant reduction in the DC link capacitor, potentially without any complicated voltage or current sensing requirements from the secondary side. A switching methodology of the WPT system described herein may avoid substantial increases in the turn-on switching loss of the inverter, and in one embodiment may minimize the turn-on switching loss despite operating with a reduced form of the DC link capacitor relative to conventional systems.

The WPT system 100 in the illustrated embodiment of FIG. 1A includes a remote device 102 and a wireless power supply 110 configured to transmit wireless power to the remote device 102. For purposes of disclosure, the remote device 102 is described herein is a vehicle; however, the remote device 102 or one or more components thereof may be incorporated into any type of apparatus or device, including, for instance, a mobile phone or table top appliance.

Additional examples of applications include a vehicle provided as an electric vehicle, a plug-in hybrid electric vehicle, or an electric/plug-in hybrid combat vehicle. Further example applications can relate to energy storage provided in a variety of forms, including a stationary or mobile energy storage system, a low/high voltage battery charger being a cell phone, a laptop, a tablet, a power tool, a gardening tool, a handheld vacuum cleaner, a kitchen gadget, any type of battery charger or adapter, chargers for portable electronics (including cameras, laptops, and cell phones), house-hold appliances with grid isolation requirements, air mobility vehicles (such as electric/hybrid propulsion aircraft, drones, UAVs, and satellites), laser applications, LEDs, single-phase or three-phase grid systems with medium or low grid voltage networks, fuel cell, solar, or wind turbine renewable energy conversion systems, microturbines (e.g., in grid connected applications), and High Voltage (HV) systems.

The remote device 102 in the illustrated embodiment includes a wireless power receiver 122 (e.g., a receiver) separable from and capable of coupling with a transmitter 112 of the wireless power supply 110. The wireless power supply 110 may be considered an off-board module. One or more aspects of the remote device 102, as described herein, may be considered an on-board module. For instance, receiver circuitry 120, including the receiver 122 and a capacitor 124, and rectification circuitry 132 may form at least part of an on-board module of a vehicle. The receiver circuitry 120 may form part of an energy storage charging system of the vehicle, where a load 134 is a battery of the vehicle.

The remote device 102 includes a load 134 operable to use power received wirelessly from the wireless power supply 110. For instance, the wireless power receiver 122 may be operably coupled to the load 134 to provide power thereto. The load 134 may include an on-board charge operable to charge a battery. The receiver 122 in the illustrated embodiment is a secondary coil or a pick-up coil; however, it is to be understood that the present disclosure is not so limited.

In the illustrated embodiment of FIG. 1A, the wireless power supply 110 may include transmitter circuitry 111 having the transmitter 112 (e.g., a primary coil) operable to couple with the receiver 122 for wirelessly transferring power, such as by magnetic coupling or inductive coupling. As described herein, the transmitter 112 and the receiver 122 may vary depending on the application, and are not limited to a single primary coil or a single secondary coil.

The wireless power supply 110 may be operable to receive power from an AC power source 50. In one embodiment, the AC power source 50 may be provided via grid power or utility power, and may be single phase or three-phase depending on the application as described herein.

The wireless power supply 110 in the illustrated embodiment includes a controller 140 operably coupled to driver circuitry 144 and a sensor 142. The sensor 142 may be configured to detect a characteristic of power with respect to the DC power source 150, such as the DC link voltage of the DC link capacitor 156, and to provide sensor output indicative of the detected characteristic to the controller 140. The sensor 142 is shown separate from the controller 140, but may be integral therewith in one embodiment. The driver circuitry 144 may pass through conductors that provide a direct connection between the switching circuitry 116 and the controller 140. Alternatively, the driver circuitry 144 may include a multiplexor or signal conditioning circuitry, or both, to translate output from the controller 140 to direct operation of the switching circuitry 116.

Figure 1B:
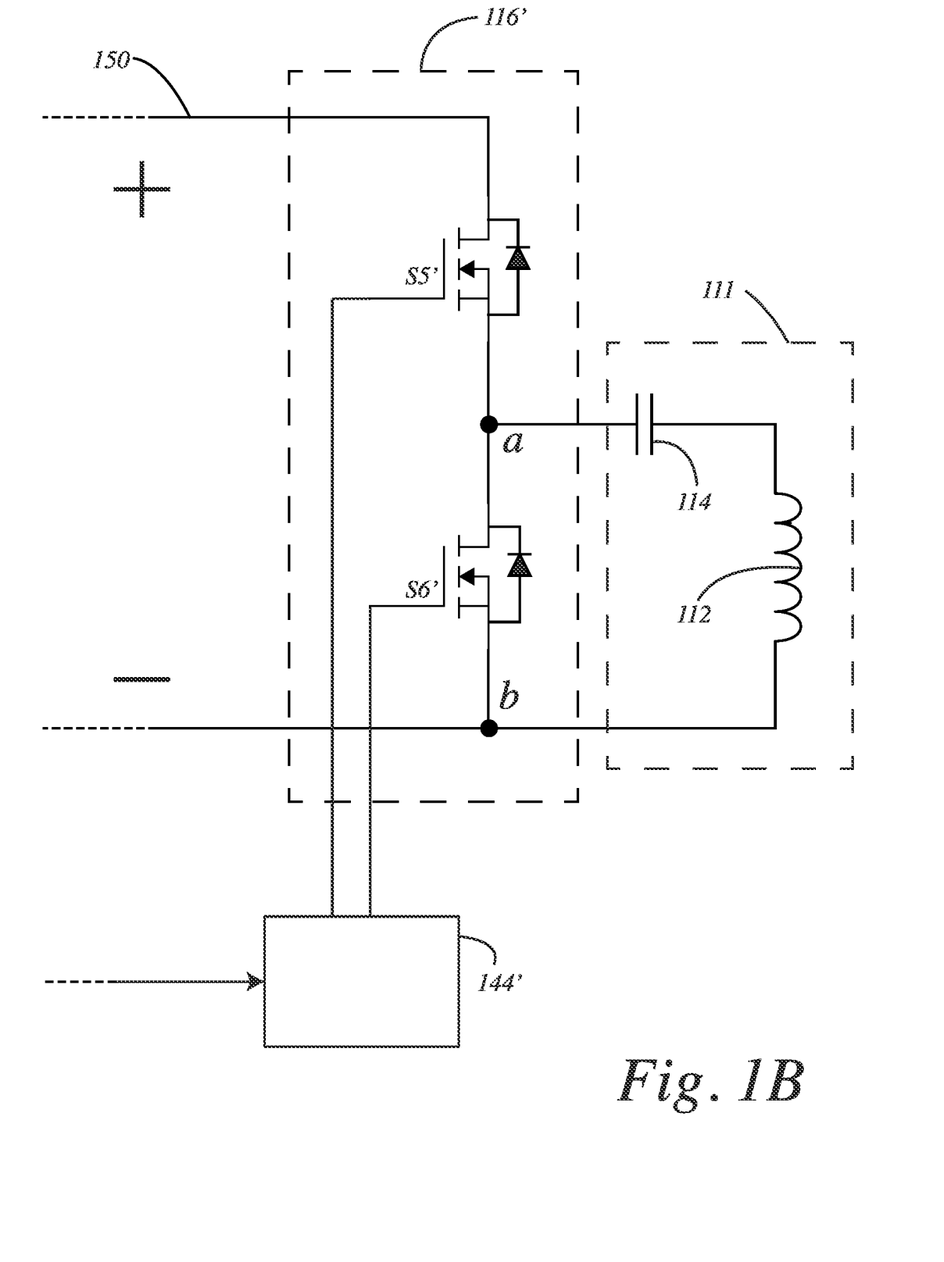
FIG. 1B shows an alternative switching configuration of a wireless power system in one embodiment.

The switching circuitry 116 in the illustrated embodiment includes an H-bridge inverter configuration (e.g., a full bridge) capable with first, second, third, and fourth switches S5, S7, S6, S8 capable of operating in conjunction with each other to provide input power to the transmitter 112. Alternatively, as depicted in the illustrated embodiment of FIG. 1B, switching circuitry 116' may be provided in a half bridge configuration with first and second switches S5', S6' operable to provide input power to the transmitter 112. The driver circuitry 144' in this alternative embodiment may be different from the driver circuitry 144 in order to drive first and second switches instead of four switches. The first and second switches S5', S6' may be similar in construction to the switches S5, S6.

The switches S5, S6, S7, S8 may be MOSFETs or any other type of switch capable of selectively supplying power to the transmitter 112.

In the illustrated embodiment, the wireless power supply 110 includes power conditioning circuitry 159 capable of conditioning the power received from the AC power source 50. The power conditioning circuitry 159 in the illustrated embodiment is a choke; however, the present disclosure is not so limited.

The controller 140 may be coupled to one or more components of the wireless power systems to achieve operation in accordance with the described functionality and methodology.

II. Control Methodology

Figure 2:
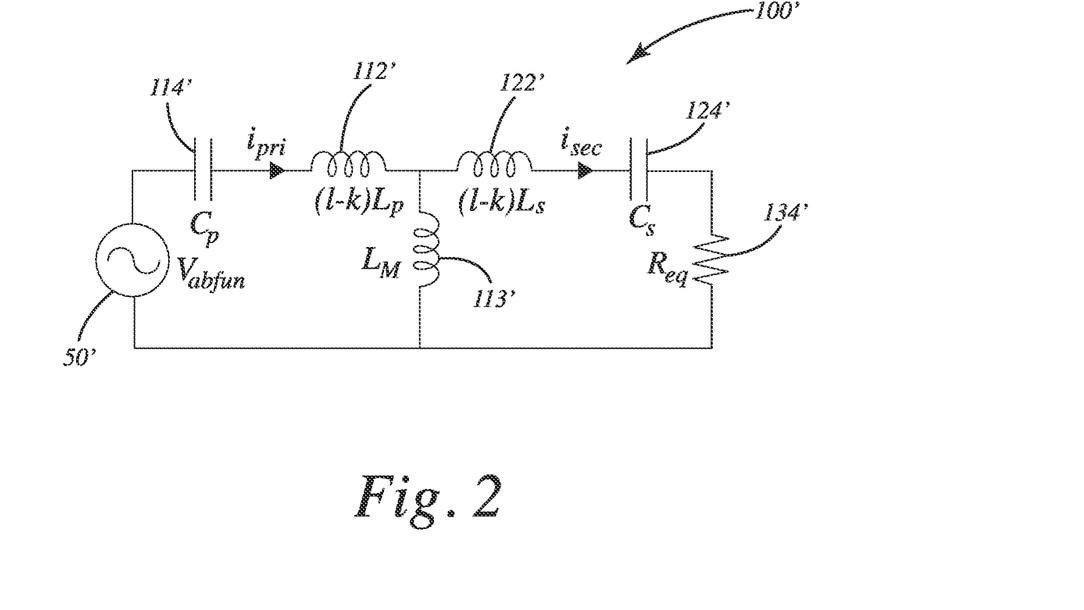
FIG. 2 shows an equivalent circuit of a wireless power system in accordance with one embodiment.

In the illustrated embodiment of FIG. 1A, the WPT system 100 may be configured to receive power from an AC power source (e.g., a grid) that is translated through the power supply circuitry 118 (e.g., single-phase front-end PFC). An equivalent circuit of a resonant stage form of the WPT system 100 is represented in FIG. 2 to facilitate considering a first harmonic approximation. The control methodology described herein may utilize feedforward control to modulate the switches S5, S6, S7, S8 in switching circuitry 118.

The feedforward control may utilize the sensor information with respect to DC link voltage as a basis for modifying a duty ratio of the switch to achieve a desired output voltage (or current). For feedforward control, the relation of the duty ratio of the switches S5-S8 to the DC link voltage (vDC) of the DC power source 150 may be established.

In one embodiment of the WPT system 100, the switches S5-S8 may operate at 50% duty ratio in complementary fashion, and the output across the terminals 'a' and 'b' can be varied by varying a phase-shift between the phase legs. In the alternative embodiment of FIG. 1B, the output across the terminals 'a' and 'b' can be varied by varying a phase-shift between the switches S5', S6'.

Figure 3:
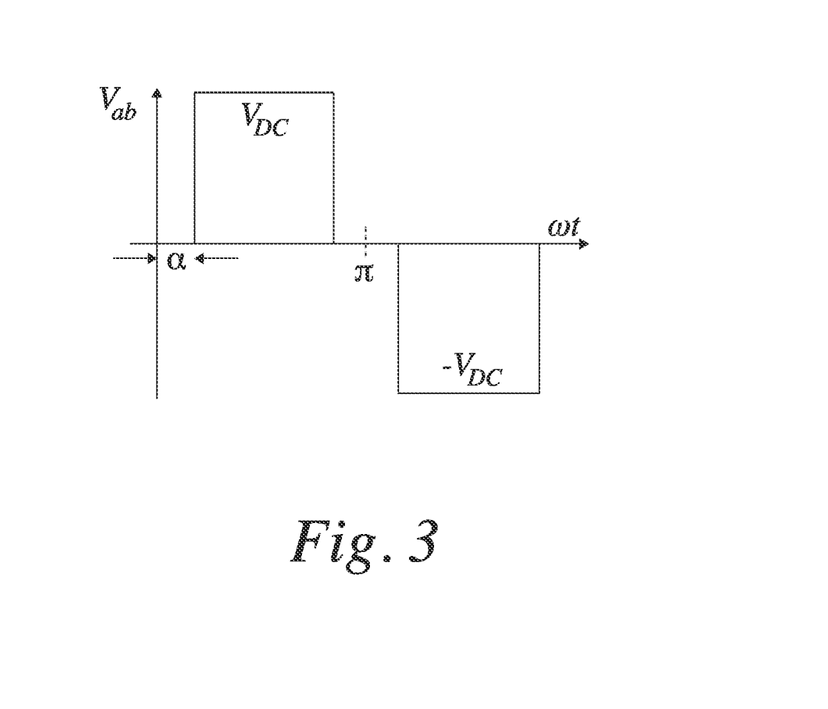
FIG. 3 shows a quasi-square wave output of switching circuitry in accordance with one embodiment.
Figure 15:
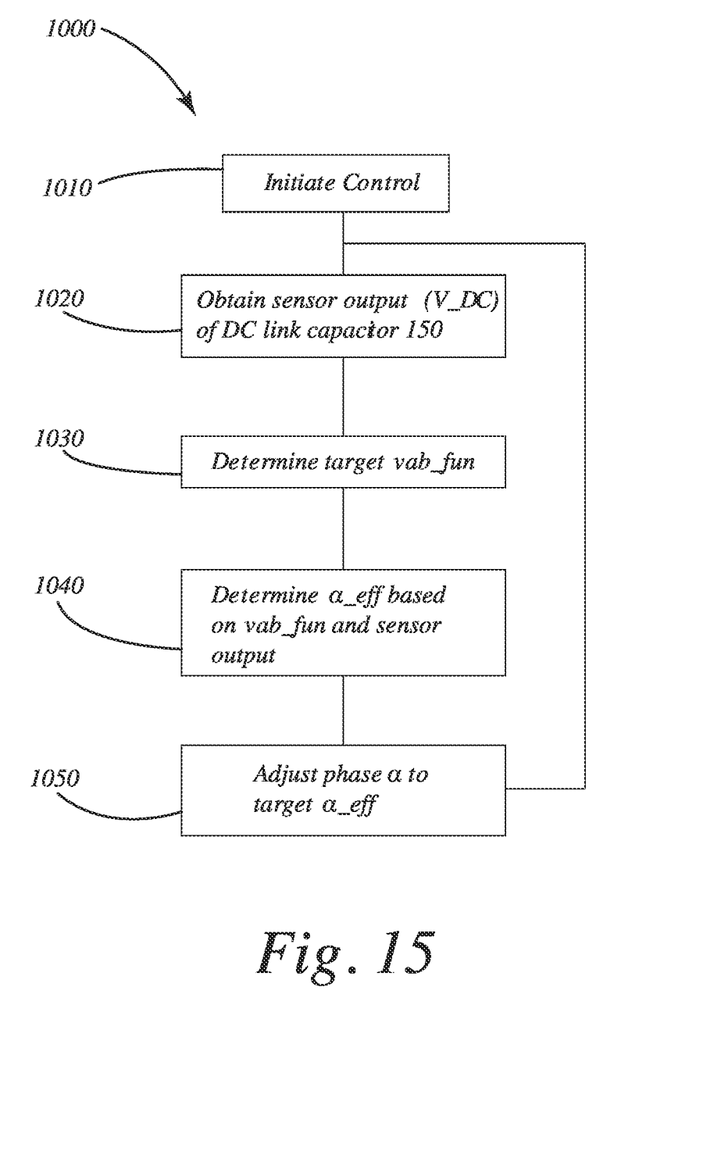
FIG. 15 depicts a method in accordance with one embodiment.

Turning back to the illustrated embodiment of FIG. 1A, for the WPT system 100 to determine the feedforward algorithm and operate in accordance with a method 1000, shown in FIG. 15, the relationship of the phase-shift to the DC link voltage of the DC power source 150 may be established and used as a basis for varying the timing of the switching circuitry 118, 118'. The output voltage vab of the switching circuitry 118, 118' can be a pure square wave or quasi-square wave. A vab in quasi-square wave mode of operation with a phase-shift α between the phase legs is shown in the illustrated embodiment of FIG. 3. In this case, the magnitude of the fundamental component $vab_{fun}$ of vab is given as:

$$vab_{fun} = \frac{4}{\pi} v_{DC} \cos \alpha \quad (1)$$

At steps 1010, 1020, 1030, the feedforward control methodology described herein in accordance with one embodiment may use sensor output with respect the DC power source 150 as a basis for modifying $vab_{fun}$ as applied to the transmitter 112. To yield a target $vab_{fun}$, the phase shift angle $\alpha_{eff}$ can be determined as:

$$\alpha_{eff} = \cos^{-1}\left(\frac{\pi}{4v_{DC}} vab_{fun}\right) \quad (2)$$

In one embodiment, based on the sensor output from the sensor 142, the DC bus or link voltage may be measured and used as a basis for determining the phase shift angle $\alpha_{eff}$ to yield a target $vab_{fun}$ despite variations in the DC link voltage. The output power of a wireless power transfer system is a function of the primary coil current which is driven by the fundamental voltage $vab_{fun}$ across it. Consequently, based on the output power, $vab_{fun}$ can be calculated. Step 1040. For instance, output power, and therefore $vab_{fun}$, can be determined based on the primary coil current. In this way, the target $vab_{fun}$ may be substantially maintained without feedback from the transmitter 112 or secondary side control. This type of feedforward control, in one embodiment, may allow for increased ripple in the DC power supply 150, thereby enabling reduction in the capacitance of the DC capacitor 156 relative to conventional control systems. The controller 1040 may adjust the α of the switching circuitry accordingly in view of the determined target value for α. Step 1050. The process may repeat.

It is noted that, in one embodiment, the minimum capacitance of the DC capacitor 156 can be determined as:

$$C_{DCmin} = \frac{V_{gpk} I_{gpk}}{4\omega_g V_{DCnom}} \times \frac{1}{\left(V_{DCnom} - \frac{\pi}{4} Vab_{fun}\right)} \quad (3)$$

In equation 3, $V_{DCnom}$ is the nominal value of the DC link voltage, $Vab_{fun}$ is the target fundamental output, $V_{gpk}$ and $I_{gpk}$ are the peak value of the grid voltage and current, and $\omega_g$ is the grid frequency.

An example of the reduction in DC link capacitance is identified below in Table 1. For a 100-kW application with the parameters in Table 1, DC link capacitance, $C_{DC}$ of 16.6 mF may be provided to limit the DC link voltage ripple ($\Delta V_{DC}$) to 2.5% of $V_{DCnom}$. In this application, considering a maximum ripple voltage as 20% of $V_{DCnom}$ of 800 V and considering $V_{abfun} = V_{DCmin}$, $C_{DC}$ can be reduced to a minimum value of 2 mF thereby obtaining 87% reduction in the DC link capacitance.

TABLE 1

Example System Parameters

| | |
|---|---|
| Grid Voltage (vg) | 480 V rms |
| Grid Frequency (ωg) | 60 Hz |
| Maximum Output Power | 100 kW |
| Nominal DC link Voltage (VDCnom) | 800 V |
| Primary and Secondary Inductance (LP, LS) | 32.12 tiH |
| Primary and Secondary Capacitance (CP, CS) | 110 nF |
| Coupling Factor (k) | 0.22 |
| Switching Frequency (fs) | 85 kHz |

III. Converter Loss Analysis

Figure 4A:
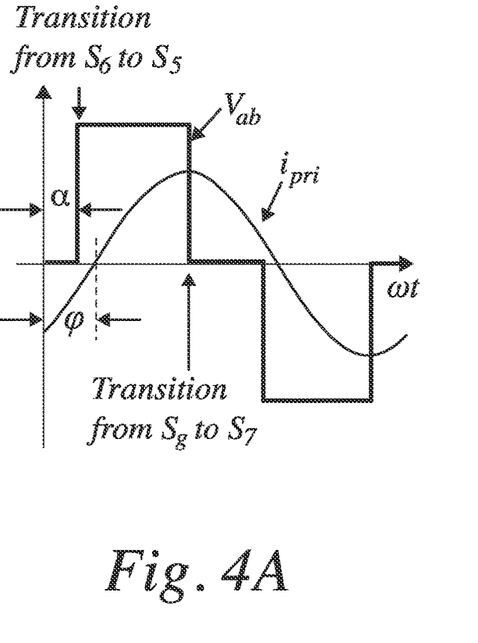
FIGS. 4A-B show output of switching circuitry in accordance with one embodiment.
Figure 4B:
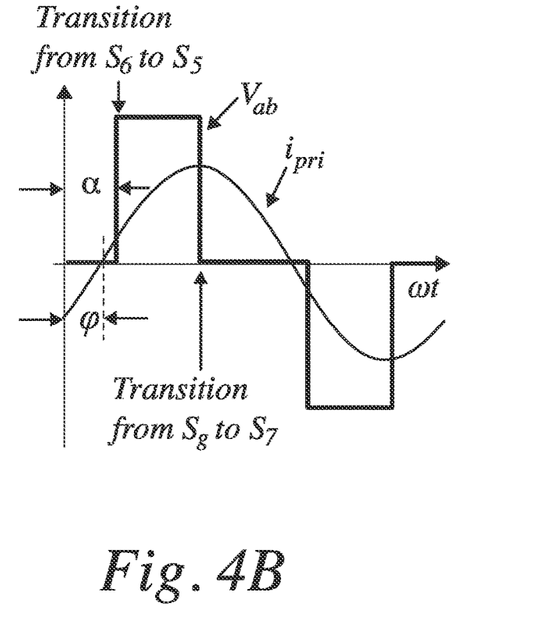

In one embodiment, the primary side includes a switching circuitry 118 (S5, S6, S7, S8) that operates as a high-frequency inverter. It may be useful to operate the switches as described herein to target zero voltage turn-on (ZVS) conditions in order to achieve high efficiency operation. In one embodiment, under quasi-square wave mode of operation, two distinct situations may arise as depicted in FIGS. 4A-B. ZVS turn-on of the leading leg switches S5 and S6 is possible when the α is less than φ as shown in FIG. 4A. In this scenario, during the switching transition from S6 to S5, the current through the corresponding phase leg ($i_{pri}$) is negative and vice versa. This facilitates natural discharging of the output capacitance of the incoming switch. However, in FIG. 4B, where α is greater than φ, $i_{pri}$ is positive during the transition from S6 to S5 and vice versa; therefore, in this scenario, ZVS turn-on of S5 and S6 may not be possible. It can be observed from FIGS. 4A-B that the lagging leg (S7-S8), undergoes ZVS in both switches as depicted by FIG. 4A and FIG. 4B. The angle, φ, is the angle of $i_{pri}$ with respect to $vab_{fun}$ and can be obtained by solving the equivalent circuit shown in FIG. 2.

Figure 5:
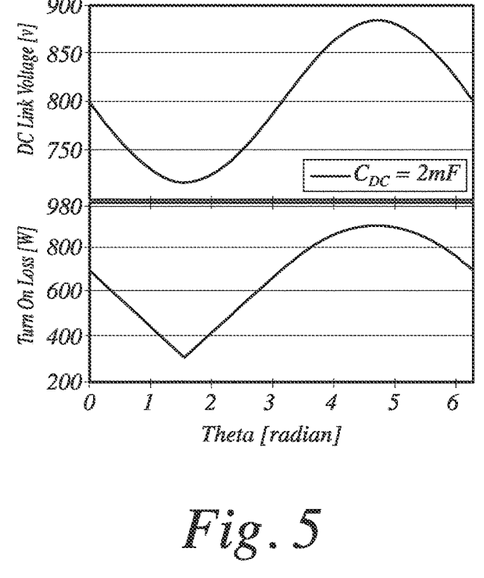
FIG. 5 shows turn-on losses in accordance with one embodiment.
Figure 6:
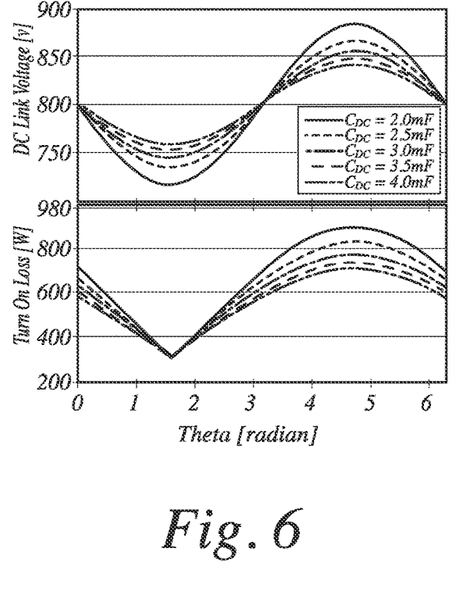
FIG. 6 shows turn-on losses in accordance with one embodiment.
Figure 7:
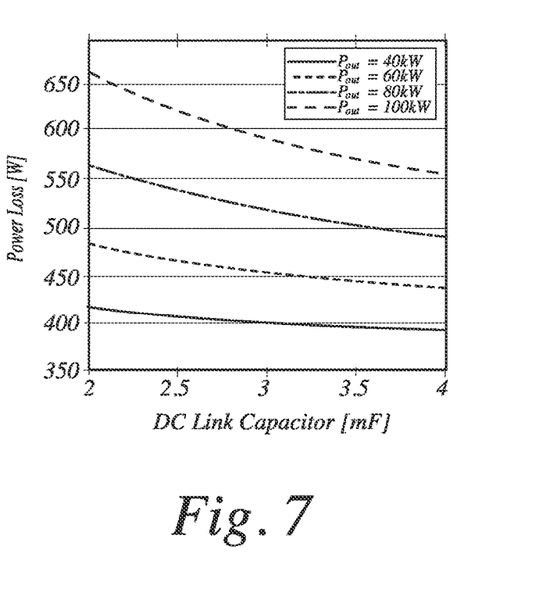
FIG. 7 shows turn average turn-on losses in accordance with one embodiment.

A series-series compensated WPT, similar to the WPT system 100, may be operated at resonance frequency. At this operating frequency, the primary current, $i_{pri}$, is in phase with $vab_{fun}$. As a result, the feedforward control methodology with quasi square wave output may be similar in operation to the situation depicted in FIG. 4B and may incur additional switching losses, which may be due to the hard turn-on of S5 and S6. FIGS. 5-7 show the switching losses for a system using parameters listed in Table.1. The turn-on loss for switch S5 is shown in FIG. 5 for one cycle of the DC link voltage with DC link capacitance of 2 mF. The peak to peak DC link ripple for an output power of 100 kW is 170 V (about 21% of the nominal DC link voltage of 800 V). The turn-on loss is minimum at the minimum value of the DC link voltage where the angle α approaches zero and is maximum at the peak of the DC link voltage, where α is maximum. The average turn-on loss is 665 W which is 0.67% of the total output. It is noted that, from FIG. 5, at the minimum DC link voltage, where both α and φ are close to zero, the turn-on loss is not zero and has a finite value. This loss represents the output parasitic capacitance (Coss) loss of the devices.

The turn-on loss for different DC link capacitance at output power of 100 kW is shown in FIG. 6. The plots show that with reduction in DC link capacitance (corresponding to increased ripple voltage on the DC link) the turn-on switching loss increases. This increase is attributed to the fact that at higher ripple voltage, the feedforward control methodology increases the phase-shift angle α, to maintain a steady value of $vab_{fun}$. With the increase in α, the current, $i_{pri}$, at the switching instant increases contributing to increased turn-on loss of S5 and S6. The load resistance is varied and the total switching loss (average) of the switching circuitry 118 is plotted in FIG. 7 for different DC bus capacitance at different output power levels. FIG. 7 shows the average increase in losses with reduction of the DC link capacitance. Based on FIG. 7, it can be estimated that, at an output power of 100 kW, a decrease in DC link capacitance of 50% (2 mF from 4 mF) increased switching losses by only 0.67%. At $P_{out}$ of 40 kW the same decrease in DC link capacitance of 50% (2 mF from 4 mF) increased switching losses by only 1.05%. Depending on the output power, the plots in FIG. 6 and FIG. 7 facilitate to identifying a tradeoff between the selection of the DC link capacitor 156 and a minor reduction in efficiency. It is noted, however, that the present disclosure is not limited to configurations that do not achieve ZVS switching additional ZVS assisting circuits can be added to ensure ZVS turn-on, including ZVS turn-on of S5 and S6.

Figure 8:
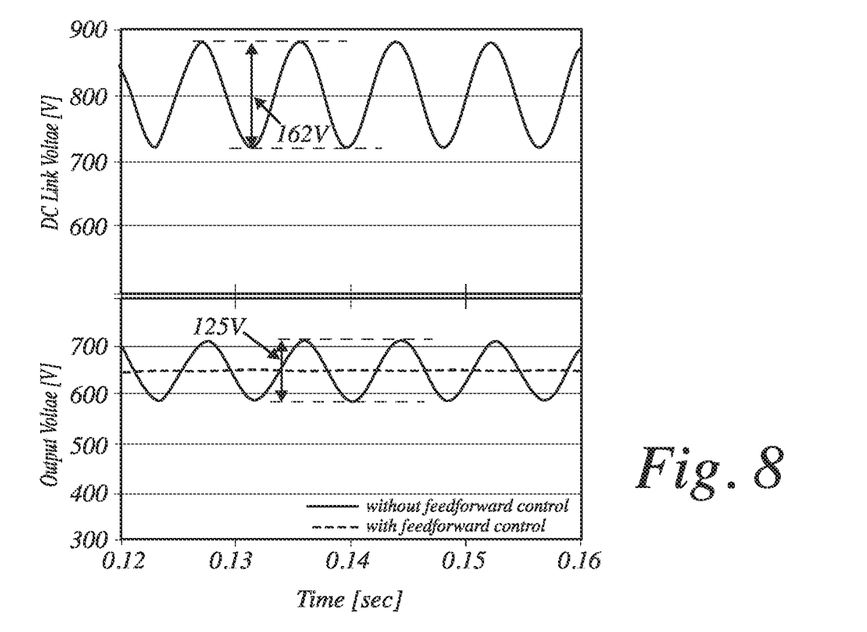
FIG. 8 shows DC link and output voltage in accordance with one embodiment.
Figure 9:
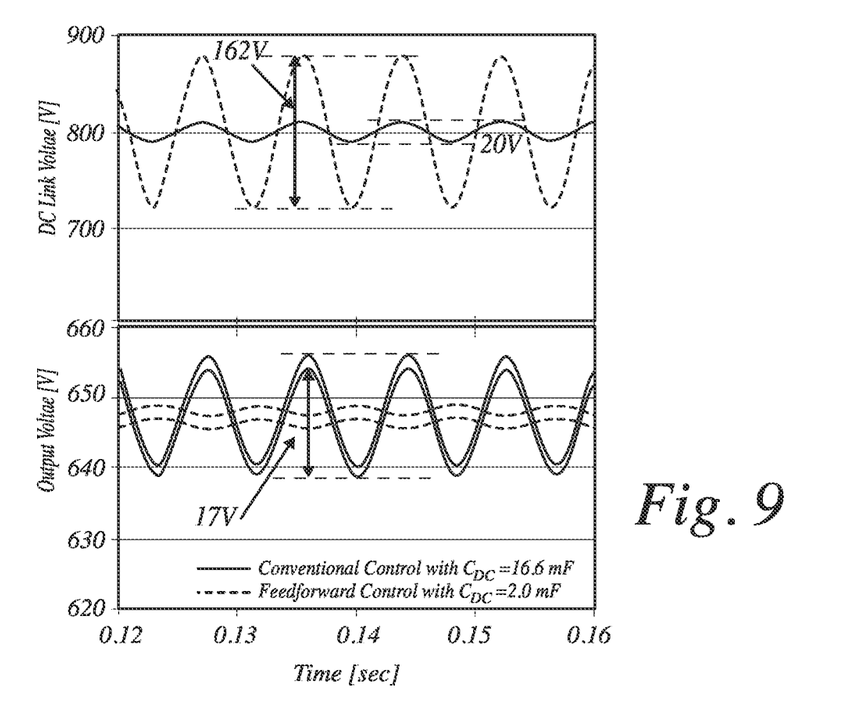
FIG. 9 shows DC link and output voltage in accordance with one embodiment.

The feedforward control methodology in accordance with one embodiment, based on system parameters in Table 1, and a DC link capacitor 156 ($C_{DC}$) that is fixed at 2 mF, may yield the results shown in FIG. 8 alongside a conventional control system without the feedforward control. FIG. 8 indicates that for 162 V (corresponding to 20% of $V_{DCnom}$) ripple on the input or front-end DC link, the output voltage has about 125 V ripple without the feedforward control, which reduced drastically with the feedforward control described herein. FIG. 8 provides confirmation that, for the same DC link capacitance, the feedforward control can maintain a steady and non-oscillatory output voltage under varying DC link voltages (given in dashed trace). The feedforward control methodology in accordance within one embodiment may yield less ripple with $C_{DC}$=2 mF over conventional control with $C_{DC}$=16.6 mF as presented in FIG. 9. For the same output power, the input DC link has a ripple of 162V for $C_{DC}$=2 mF. This ripple may be suppressed using higher capacitance value. For example, here $C_{DC}$=16.6 mF reduced the DC link ripple to 20V. However, it can be seen from FIG. 10 that even with a higher $C_{DC}$ of 16.6 mF, the output voltage with conventional open-loop control has more ripple (approximately 17 V) compared to the output under the feedforward control of the present disclosure using a $C_{DC}$ of 2 mF. The feedforward control may achieve steadier output voltage with ⅛ of the capacitance (2 mF compared to 16.6 mF) provided in the conventional approach.

Figure 10:
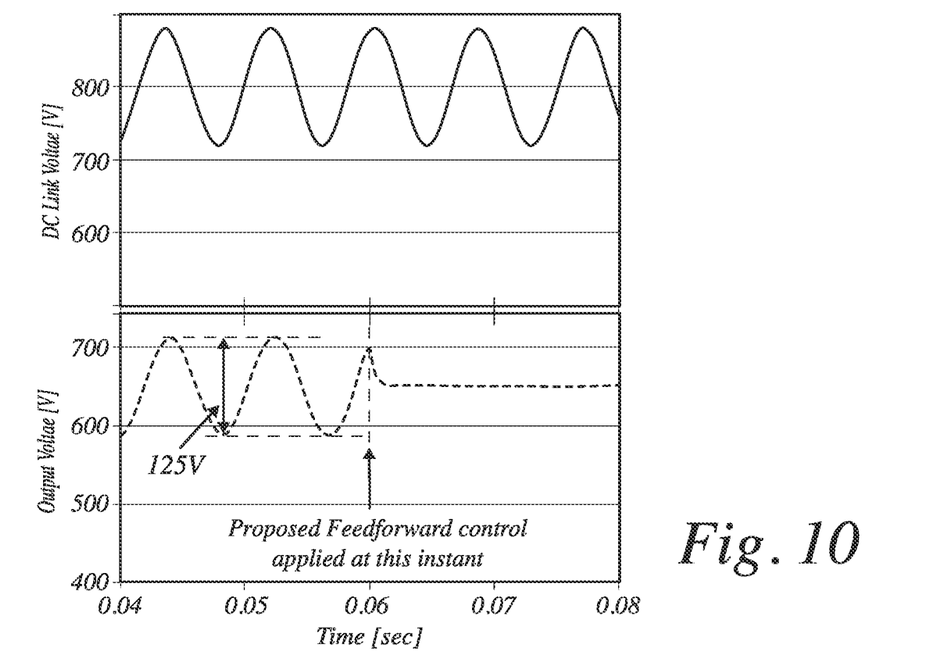
FIG. 10 shows output prior to and after control in accordance with one embodiment.
Figure 11:
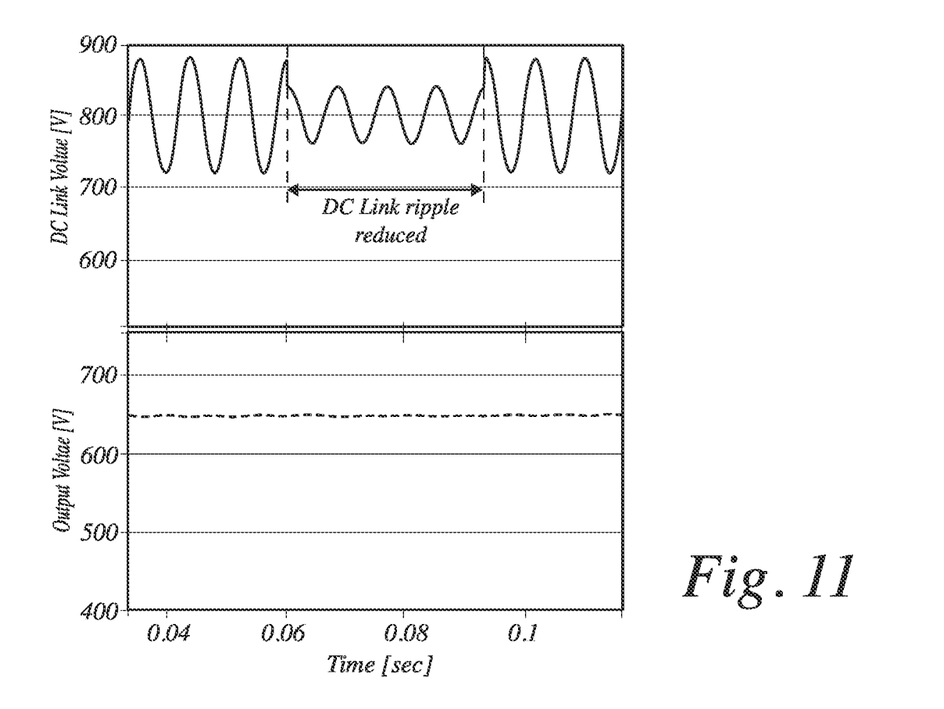
FIG. 11 shows DC voltage of the DC capacitor prior to and after control in accordance with one embodiment.
Figure 12:
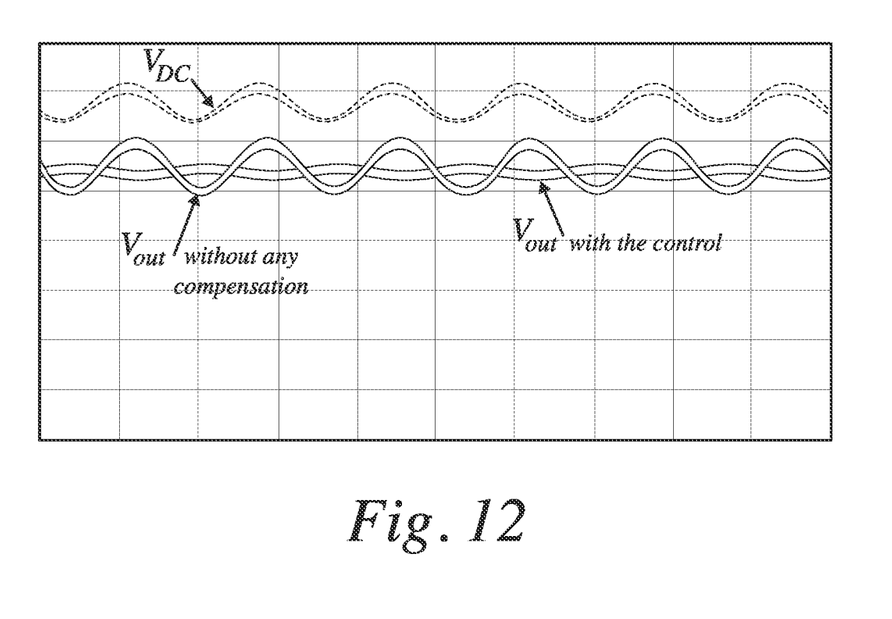
FIG. 12 shows output with and without control in accordance with one embodiment.
Figure 13:
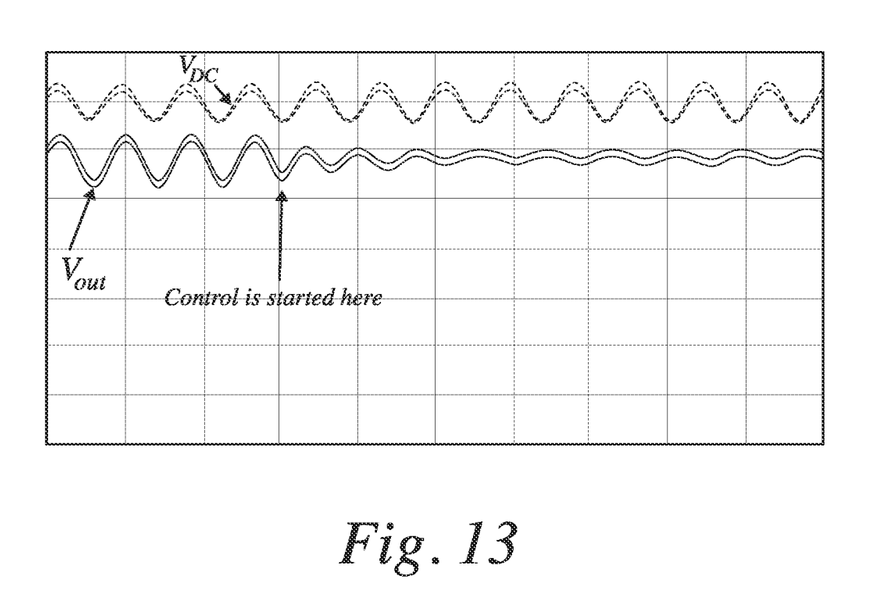
FIG. 13 shows output prior to and after control in accordance with one embodiment.
Figure 14:
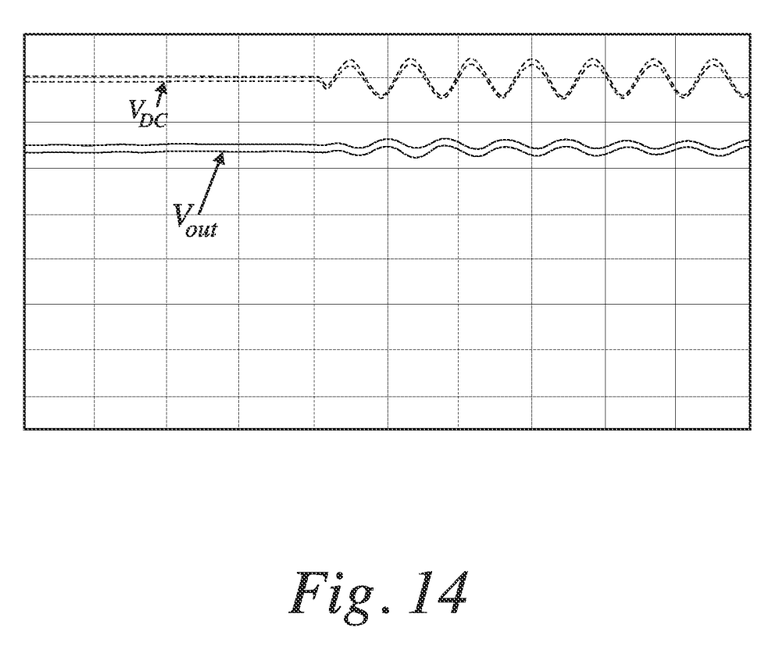
FIG. 14 shows output with and without control in accordance with one embodiment.

The dynamic performance of the feedforward control in one embodiment is depicted in FIG. 10 and FIG. 11. The WPT system 100 may be started with an oscillatory input DC link (corresponding to $C_{DC}$=2 mF) and then the feedforward control is initiated at t=0.06 seconds. The results are shown in FIG. 10, where the oscillatory output voltage becomes near constant (or constant) and non-oscillatory after the feedforward control is applied. The performance of the feedforward control in regulating the output with change (both increase and decrease) in the input DC link oscillations is shown in FIG. 11. The input DC link ripple is reduced from 160 V to 80 V and after 4 ripple cycles changed back to 160 V. It is seen from FIG. 11 that during both the high to low or low to high transitions in the DC link ripple the output voltage was steady and relatively constant with the feedforward control.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A wireless power transfer (WPT) system for wirelessly providing AC power to an electric vehicle or a plug-in electric vehicle, the WPT system comprising: an off-board module comprising:
   a DC-link capacitor bank to facilitate providing, during operation of the WPT system, a DC voltage across the DC-link capacitor bank with a ripple;
   a voltage sensor to measure the DC voltage across the DC-link capacitor bank as a DC voltage signal $V_{DC}(t)$;
   an H-bridge having a first phase leg and a second phase leg, the H-bridge coupled with the DC-link capacitor bank and configured to convert the DC voltage across the DC-link capacitor bank to a high-frequency AC voltage; and control circuitry configured to: receive the DC voltage signal $V_{DC}(t)$ from the voltage sensor, generate a driving signal for driving the H-bridge, and apply a first instance of the driving signal to the first phase leg, and a second instance of the driving signal to the second phase leg, where the first and second instances of the driving signal have a relative phase shift a(t) that varies nonlinearly with the DC voltage signal $V_{DC}(t)$, wherein the relative phase shift a(t) varies nonlinearly with the DC voltage signal $V_{DC}(t)$ in accordance with $$a(t) = \cos^{-1}\left(\frac{\pi}{4V_{DC}(t)}V_f\right),$$

where Vf is a target amplitude of a fundamental component of the high-frequency AC voltage.

2. The WPT system of claim 1, wherein the control circuitry comprises a microcontroller configured to implement the relative phase shift a(t) that varies nonlinearly with the DC voltage signal $V_{DC}(t)$.

3. The WPT system of claim 1, wherein the relative phase shift a(t) is based on a target amplitude Vf of the fundamental component of the high-frequency AC voltage.

4. The WPT system of claim 3, wherein a frequency of the fundamental component of the high-frequency AC voltage is 22 kHz or 85 kHz.

5. The WPT system of claim 1, wherein, for a WPT system power rating of 100 kW, and for a DC voltage with a nominal value in a voltage range of 350-800 V and a ripple of ±10%, capacitance of the DC-link capacitor bank is in a capacitance range of 2-4 mF.

6. The WPT system of claim 5, wherein the DC-link capacitor bank comprises 10-20 film capacitors each having a capacitance of about 220 μF.

7. The WPT system of claim 1, wherein:
   the off-board module comprises transmitter circuitry comprising a primary coil configured to wirelessly transmit the high-frequency AC voltage, and
   the WPT system comprises an on-board module comprising a pick-up coil configured to receive the high-frequency AC voltage when the primary coil and the pick-up coil are disposed proximal to each other.

8. A system for wirelessly transferring power to a remote device, the system comprising:
   a transmitter configured to wirelessly transmit the power to a receiver of the remote device;
   switching circuitry coupled to the transmitter, the switching circuitry configured to receive DC power, the switching circuitry configured to apply a high-frequency AC voltage to the transmitter based on the DC power, the switching circuitry including a first switch controlled by a first drive signal and a second switch controlled by a second drive signal;

a sensor configured to detect a characteristic of power of the DC power; and a controller operably coupled to the switching circuitry and the sensor, the controller configured to direct operation of the switching circuitry to apply the high-frequency AC voltage to the transmitter based on the DC power, the controller configured to vary a phase relationship between the first and second drive signals based on the characteristic of power of the DC power sensed by the sensor with respect to the DC power received by the switching circuitry, wherein the phase relationship is defined as a(t) and the characteristic of power of the DC power is defined as $V_{DC}(t)$, and where the controller determines the phase relationship a(t) as $$a(t) = \cos^{-1}\left(\frac{\pi}{4V_{DC}(t)}V_f\right),$$

where Vf is a target amplitude of a fundamental component of the high-frequency AC voltage.

9. The system of claim 8 wherein:
the switching circuitry includes a third switch and a fourth switch controlled respectively by third and fourth drive signals;
the first switch and the third switch define a first phase leg;
the second switch and the fourth switch define a second phase leg; and
the controller is configured to vary a phase relationship between the first phase leg and the second phase leg based on the characteristic of power of the DC power sensed by the sensor with respect to the DC power received by the switching circuitry.

10. The system of claim 8 wherein the characteristic of power of the DC power is a DC voltage of the DC power received by the switching circuitry.

11. The system of claim 8 comprising power supply circuitry operable to receive AC power, the power supply circuitry operable to generate the DC power based on the AC power.

12. The system of claim 11 wherein the phase relationship between the first and second drive signals is varied nonlinearly as a function of the characteristic of power of the DC power sensed by the sensor with respect to the DC power received by the switching circuitry.

13. The system of claim 8 comprising the receiver operable to receive the power inductively transferred from the transmitter, wherein the receiver is provided in the remote device and operable to supply the power to a load of the remote device.

14. A wireless power supply for supplying power to a remote device, the wireless power supply comprising:
a transmitter configured to wirelessly supply the power to the remote device;
switching circuitry coupled to the transmitter, the switching circuitry configured to receive DC power, the switching circuitry configured to apply a high-frequency AC voltage to the transmitter based on the DC power, the switching circuitry including a first switch controlled by a first drive signal and a second switch controlled by a second drive signal;
a sensor configured to detect a characteristic of power of the DC power; and
a controller operably coupled to the switching circuitry and the sensor, the controller configured to direct operation of the switching circuitry to apply the high-frequency AC voltage to the transmitter based on the DC power, the controller configured to vary a phase relationship between the first and second drive signals based on the characteristic of power of the DC power sensed by the sensor with respect to the DC power received by the switching circuitry, wherein the phase relationship is defined as a(t) and the characteristic of power of the DC power is defined as $V_{DC}(t)$, and where the controller determines the phase relationship a(t) as $$a(t) = \cos^{-1}\left(\frac{\pi}{4V_{DC}(t)}V_f\right),$$

where Vf is a target amplitude of a fundamental component of the high-frequency AC voltage.

15. The wireless power supply of claim 14 wherein power supply circuitry is operable to receive AC power, the power supply circuitry operable to generate the DC power based on the AC power.

16. The wireless power supply of claim 15 wherein the phase relationship between the first and second drive signals is varied nonlinearly as a function of the characteristic of power of the DC power sensed by the sensor with respect to the DC power received by the switching circuitry.

* * * * *